United States Patent
Hoogerbrugge et al.

(10) Patent No.: US 6,785,770 B2
(45) Date of Patent: Aug. 31, 2004

(54) DATA PROCESSING APPARATUS WITH A CACHE MEMORY AND METHOD OF USING SUCH AN APPARATUS

(75) Inventors: Jan Hoogerbrugge, Eindhoven (NL); Paul Stravers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 113 days.

(21) Appl. No.: 09/894,088

(22) Filed: Jun. 28, 2001

(65) Prior Publication Data

US 2002/0049889 A1 Apr. 25, 2002

(30) Foreign Application Priority Data

Jun. 30, 2000 (EP) ............................................ 00202297

(51) Int. Cl.$^7$ ............................................... G06F 12/12
(52) U.S. Cl. ..................... 711/133; 711/134; 711/159
(58) Field of Search ................................ 711/133, 134, 711/136, 159, 170, 172

(56) References Cited

U.S. PATENT DOCUMENTS

| | | | |
|---|---|---|---|
| 5,737,752 A | 4/1998 | Hilditch ...................... | 711/133 |
| 5,943,687 A * | 8/1999 | Liedburg ..................... | 711/156 |
| 6,272,598 B1 * | 8/2001 | Arlitt et al. .................. | 711/133 |
| 6,385,699 B1 * | 5/2002 | Bozman et al. .............. | 711/133 |
| 6,408,362 B1 * | 6/2002 | Arimilli et al. .............. | 711/133 |

FOREIGN PATENT DOCUMENTS

GB  2345987 A  7/2000  ........... G06F/12/08

* cited by examiner

*Primary Examiner*—Gary Portka
(74) *Attorney, Agent, or Firm*—Michael J. Ure

(57) ABSTRACT

A data processing apparatus has a main memory that contains memory locations with mutually different access latencies. Information from the main memory is cached in a cache memory. When cache replacement is needed selection of a cache replacement location depends on differences in the access latencies of the main memory locations for which replaceable cache locations are in use. When an access latency of a main memory location cached in the replaceable cache memory location is relatively smaller than an access latency of other main memory locations cached in other replaceable cache memory locations, the cached data for that main memory location is replaced by preference over data for the other main memory locations, because of its smaller latency.

11 Claims, 2 Drawing Sheets

Figure 1:
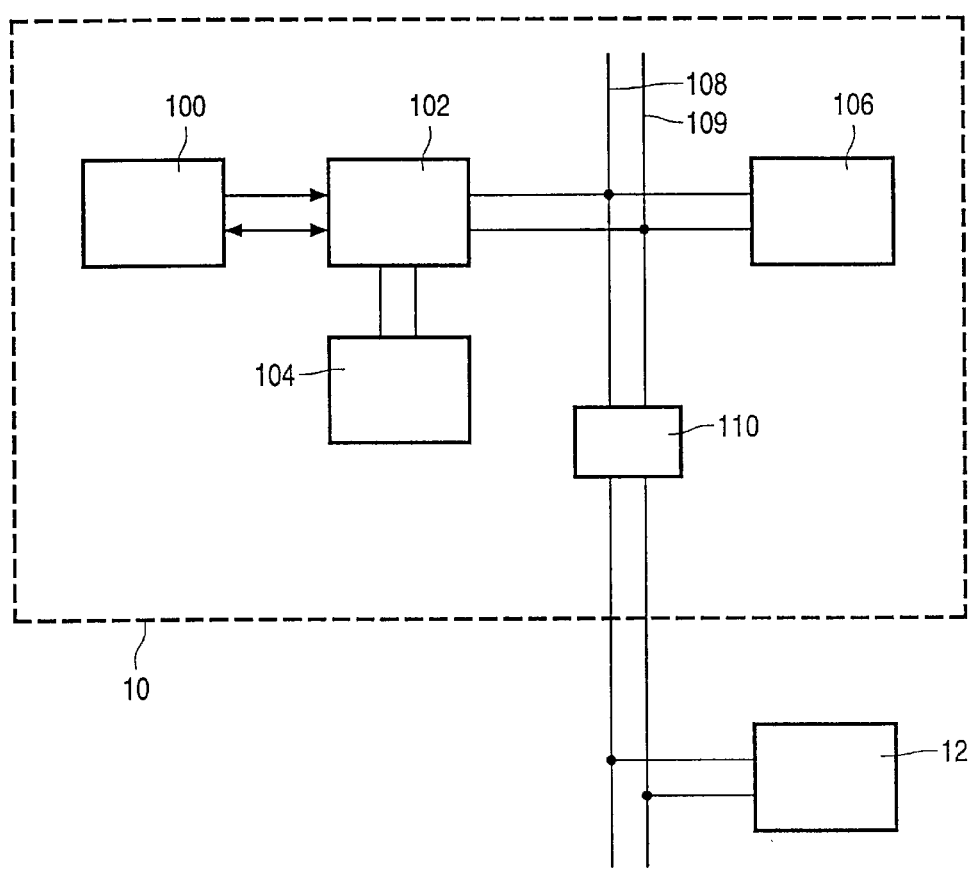

DATA PROCESSING APPARATUS WITH A CACHE MEMORY AND METHOD OF USING SUCH AN APPARATUS

The invention relates to a data processing apparatus with a cache memory, an integrated circuit for use in such an apparatus and to a method of operating such an apparatus.

Cache memories are well known in the art, for example from U.S. Pat. No. 5,737,752. They serve to bridge the gap between the operating speed of a processor and that of a main memory. The cache memory has a higher operating speed than the main memory. When the processor uses (or is expected to use) data from main memory, a copy of that data is stored in the cache memory. Thus, when the processor needs the data, the data can be fetched from the cache memory faster than it could be fetched from main memory.

Conventionally, cache memories have been used between microprocessors and large off-chip DRAM memories. The cache is an SRAM preferably incorporated on the same chip as the microprocessor. Current technology allows the manufacture of processors and SRAMs, which are orders of magnitude faster than DRAMs. Cache memory has also been used for on-chip main memory, i.e. for integrated circuits in which the processor, the main memory and the cache are all integrated in the same integrated circuit. In this case, the main memory is also slow, for example because the on-chip main memory is optimized to reduce silicon area and rather than to maximize speed. In this case too, the cache is a faster memory that bridges the resulting gap in operating speed with the processor. A cache memory may even be applied to a processing apparatus where a first part of the main memory is on-chip together with the processor and the cache memory and second part of the main memory (still in the same memory space as the first part) is off-chip. In this case the cache memory is used to bridge different gaps in operating speed: the gap between the processor and the first part of main memory and the gap between the processor and the second part of main memory, the latter gap being generally larger than the former.

Cache memory is generally much smaller than main memory. When data from a main memory location is to be stored in cache memory and no free cache memory location is available, data that is in the cache for another main memory location will have to be overwritten. A cache management unit selects which cache location will be used. The selection depends on the cache replacement strategy. One well known strategy is the Least Recently Used (LRU) strategy, which selects the cache location that was least recently used by the processor. U.S. Pat. No. 5,737,752 describes a cache that uses this replacement mechanism or another user-selectable replacement mechanism, as an example of a user-selectable replacement mechanism this patent mentions random selection.

Amongst others, it is an object of the invention to provide a processing apparatus and method of operating a processing apparatus with an improved cache replacement strategy.

The method according to the invention is set forth in claim 1. According to the invention, the cache replacement strategy is made dependent on the latency of the main memory locations for which data is in cache. When it is necessary to create room in the cache for storing new data, the memory management unit preferably select a location that is occupied by data for a main memory location that has a shorter access latency than other main memory locations for which data is in the cache. Thus, the differences in access latency of the main memory are exploited, in that it is expected that less time will be lost if the replaced has to be fetch the replaced data again from main memory. As an example, the access latency of different memory locations may differ because part of the main memory locations are in an on-chip DRAM and part of the main memory locations are in an off-chip DRAM.

Figure 2:
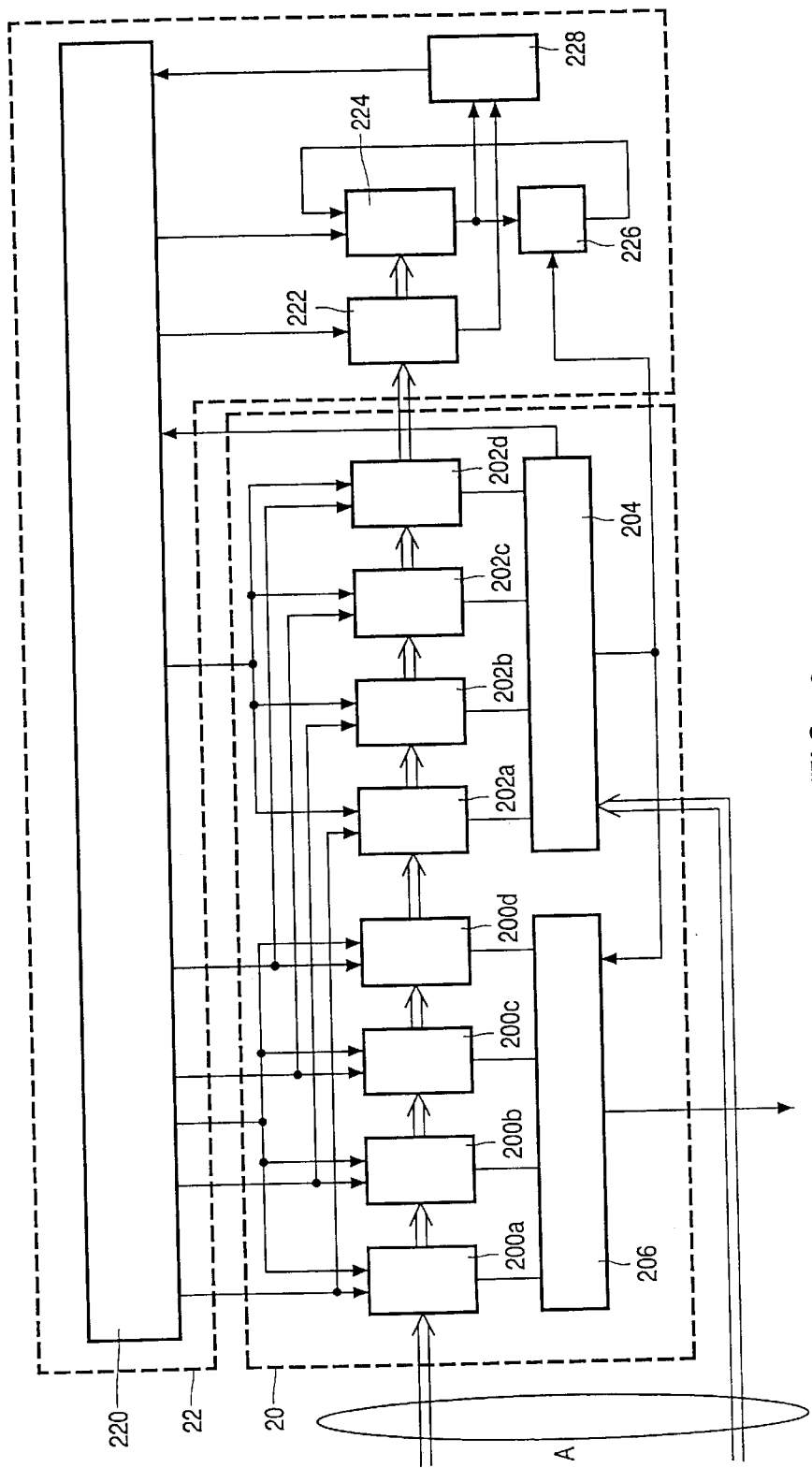

These and other advantageous aspects of the invention will be described in more detail using the following figure, of which FIG. 1 shows a processing circuit, FIG. 2 shows an example of an embodiment of a cache memory and cache management unit.

FIG. 1 shows a processing circuit that comprises an integrated circuit 10 and an external memory 12. The integrated circuit contains a processor 100, a cache management unit 102, a cache memory 104, a local memory 106 and a bus 108, 109. The bus contains an address bus 109 and a data bus 108. Cache management unit 102 is coupled to cache memory 104. The processor 100 is connected to the bus 108, 109 via cache memory 104. The local memory 104 is connected to the bus 108, 109. The bus is connected to an external interface 110 of the integrated circuit 10. The bus 108, 109 has a part inside the integrated circuit 10 and a part outside the integrated circuit. External memory 12 is connected to the part of the bus 108, 109 outside the integrated circuit.

Local memory 106 and external memory 12 are parts of the same address space of a conceptual main memory that is visible for the processor 100, local memory 106 providing for example memory cells for a first range of memory addresses and external memory 12 providing memory cells for a second range of addresses.

In operation, processor 100 executes a program. In the course of program execution processor 10 addresses main memory 12, 106, for example to load instructions and/or to execute a load instruction to load data from main memory 12, 106. When processor 100 addresses main memory 12, 106, processor 100 passes the address to cache management unit 102. Cache management unit 102 tests whether data for the address is available in cache memory 104 and, if so, returns that data to processor 100. If no data is available in cache memory 104 for the address, cache management unit 102 passes the address to the bus 108, 109, which addresses main memory 12, 106. Dependent on whether the address addresses local memory 106 or external memory 12, the appropriate one of external memory 12 and local memory 106 passes the data for that address back to the bus 108, 109. Cache management unit 102 receives the data and returns it to the processor 10.

The time needed before the data is returned from the local memory 106 or the external memory 12 is called the access latency. The access latency is a function of the speed of the memory and the time needed to transmit the access request to the memory and to return the result. Generally, the access latency of external memory 12 will be larger than the access latency of local memory 106, because exchange of addresses and data between the integrated circuit and its exterior takes more time than a similar exchange within the integrated circuit. The circuit of FIG. 1 is shown to illustrate one cause of a difference in access latency, but of course there may be other causes, such as use of different types of memory with different speed both within or both outside the integrated circuit.

Cache management unit 102 also writes a copy of the data to cache memory 104, together with information that identifies the main memory address from which the data has been read. As a result, a next access to the same main memory location can be serviced from cache memory 104, taking less time than if the main memory needs to be accessed.

Cache management unit 102 has to select the memory location in cache memory 104 where the data is to be written. The invention is involved with the way cache management unit 102 performs this function. Cache memory 104 is organized for example as a fully associative memory or a set associative memory. This means that the copy of the data can be written at one of a number of alternative locations. Cache management unit 102 selects on of these alternative locations a memory location in cache memory 104 for storing the data. The rules used for this selection are called the cache replacement strategy. The cache replacement strategy used by cache management unit 102 affects the speed of execution of programs. Normally, the cache memory location selected for storing data for a new main memory address will already contain data for another main memory address. This means that the data for that other main memory address is sacrificed when the cache memory location is selected for storing the data for the new main memory address. Subsequent access to the data of that other main memory address will result in a cache miss and main memory will have to be accessed.

A well known cache replacement strategy is the "Least Recently Used" (LRU) strategy. A cache management unit 102 that uses the LRU strategy selects, from the memory locations in cache memory 104 that can be used for storing the data for the new memory locations, that memory location in cache memory 104 that was least recently accessed.

The cache replacement strategy used in the data processing apparatus according to the invention uses the latency of the main memory locations for which data is stored in cache memory as the primary criterion for selecting the memory location in cache memory 104 where the data for the new main memory location is to be stored. If the data for the new main memory location can be stored in a number of alternative memory locations in cache memory 104 and all these alternative locations store data for main memory locations, then with preference a location is selected that stores data for a main memory location whose latency is not larger than the latency of any other of the alternative locations. Thus, if the replacement of the data in that location results in a subsequent cache miss, because the replaced data is needed again, fetching from main memory will take less time than if the same happens for a location with relatively larger access latency.

If more than one of the main memory location for which data is stored in the alternative memory locations in cache memory 104 have the same latency and there are no alternative locations that store data for main memory locations with smaller latency, another strategy, such as LRU may be used to select from among the former alternative locations.

Cache management unit 102 operates as follows. When a cache memory location needs to be selected for replacement, at least part of a replacement priority is determined among all alternative locations that may be selected. (The word location will be used to refer to the unit of cache replacement, whether this is an individually addressable memory location or a block of memory locations). When the cache memory 104 is fully associative cache memory, the alternative locations are all cache locations. When the cache memory is set associative, the alternative locations are locations from the set addressed by the main memory location. At least for some replacement operations the cache management unit determines the replacement priority from the access latency of the main memory locations for which data is stored in the alternative locations. In one embodiment, cache management unit 102 stores data representing the access latency for each cache location, for use in determining the priority. In another embodiment, cache management unit 102 determines the access latency from the address tag of the data stored in the alternative locations in cache memory 104. For example, one latency may be assumed for memory addresses in the address range served by the local part of main memory 106, another latency being assumed for memory addresses in the address range served by the external part of the main memory 12.

In one embodiment, cache management unit 102 pre-selects those alternative locations that store data for main memory addresses that have a access latency that is not larger than the access latency for any other alternative location. This may be realized by a microprogram executed by cache management unit 102, or by parallel operating hardware for comparing memory latencies, or representations thereof. Subsequently, cache management unit selects a final location from the pre-selected locations, where the final location has not been accessed more recently than any other of the pre-selected locations. The latter selection may be implemented using normal LRU techniques. The final location is used to store the data for the new main memory location.

FIG. 2 shows an example of an embodiment of a cache memory 20 and cache management unit 22 for a set associative caching scheme. The cache memory 20 contains data memories 200a–d for data from different sets (in the following, the word "data" will be used generically for both data and instructions). Furthermore, cache memory contains tag memories 202a–d for tags of data from different sets. The cache memory 20 has an input "A" for a memory address. Part of the memory address is fed to the address inputs of the data memories 20a–d and the tag memories 202a–d (to simplify the figure, the connections for this part of the address are shown as a series connections between the memories 200a–d, 202a–d, 222, 224. This series connection merely represents a connection for use of the address in the memories 200a–d, 202a–d, 222, 224 and passing through to the next memory 200a–d, 202a–d, 222, 224, which is equivalent to supplying this part of the address to all memories in parallel, the preferred embodiment). The cache memory 20 also contains a tag comparator 204 and a data selector 206. The outputs of the tag memories 202 are coupled to the tag comparator 204, which has an input coupled to the address input A, for receiving the part of the memory address which is used for the tag. Tag comparator 204 has an output coupled to a control input of the data selector 206, which has inputs coupled to outputs of the data memories 200a–d.

Cache management unit 22 contains a control unit 220, a latency identifier memory 222, a use-sequence memory 224, a use-sequence update unit 226 and a replacement selection unit 228. The latency identifier memory 222 and the use-sequence memory 224 are addressed by the address input A. The use-sequence unit 224 has an output couple to use-sequence update unit 226, which also receives the output of the tag comparator 204. Use-sequence update unit 226 has an output coupled to an input of use-sequence memory 224. Replacement selection unit 228 has inputs coupled to the outputs of both the use-sequence memory 224 and the latency identifier memory 222. Control unit 220 is coupled to inputs of all memories 200a–d, 202a–d, 222, 224.

In operation, cache memory 20 can store data for a given memory location in any one of the data memories 200a–d. The data memories 200a–d are much smaller than required for storing the entire address space and they receive only a first part of the memory address from address input. Tag memories 202a–d serve to determine in which of the data memories 200a–d, if any, data is stored for the given memory address. For this purpose, each tag memory 202a–d stores a second part of the memory address (other than the first part) of the data stored in a corresponding one of the data memories 200a–d. The tag memories 202a–d are addressed by the first part of the address and output the second part of the address for the data stored in the corresponding data memory 200a–d. Tag comparator 204 compares this output second parts with the second part of the memory address received at the address input A. If the second part of the address from any of the tag memories 202a–d matches the second part from the address input A, tag comparator 204 signals selector 206 to pass the data from the corresponding data memory 200a–d to the output of the cache memory 20.

Use sequence memory 224 stores information that represents the sequence in which the locations in data memories 200a–d that are addressed by the first part of the memory address were last accessed. This information is output to the update unit 226, which also receives information from tag comparator 204 to identify the data memory 200a–d that is currently accessed. From this information update unit 226 determines information representing an updated sequence, and writes the update information back to use-sequence memory 224. In principle, this information represents a permutation, but instead one may use an ordered list of data memory labels.

When tag comparator 204 signals that none of the data memories 200a–d stores data for the memory address received at address input A, replacement selection unit 228 selects one of the data memories 200a–d to store data for that memory address in that selected data memory 200a–d. According to the invention, this selection depends on the latency of the main memory locations for which data is stored in data memories 200a–d. Latency identifier memory 222 stores an identifier that identifies the latencies of those main memory locations for which data is stored in data memories 200a–d at the location addressed by the first part of the memory address received from the address input. The identifier contains for example one bit for each data memory 200a–d, the bit indicating a long or short latency for the corresponding main memory location. The identifier is supplied to replacement selection unit 228, which uses the identifier so that main memory locations with relatively longer latency will not be selected if main memory locations with relatively shorter latency are available. In addition, replacement selection unit 228 may use the use-sequence received from use-sequence memory 224 to select among main memory locations with the same latency.

When data for a main memory location has been fetched from main memory, control unit 220 places the data in the data memory 200a–d selected by selection unit, at an address in the selected data memory 200a–d, the address being a first part of the main memory address. Control unit 220 places a second part of the main memory address as a tag in one of the tag memories 202a–d, which corresponds to the selected data memory 200a–d. The address at which the tag is stored in this memory is also determined by the first part of the main memory address. Control unit 220 places an indication of the latency of the main memory location for which data is newly stored in latency indication memory 222. Furthermore, use-sequence memory 224 is updated, to reflect that the selected data memory 200a–d is the last to be used for the present value of the first part of the main memory address.

Numerous variations of a access latency dependent replacement strategy are possible. Preferably, these strategies have the property that the replacement preference for main memory locations with shorter access latency is not absolute, but allows for exceptional selection of cache memory locations that store data for main memory locations with longer latency as well. This serves to prevent that data for main memory locations with longer access latency remains permanently in cache memory, which is undesirable because ultimately this data is very unlikely to be used.

This may be realized, for example, by implementing an LRU strategy in cache management unit 102 in which the duration for which the data for main memory locations is kept in cache is weighed according to the access latency of those main memory locations. The weight may be inversely proportional to the access latency for example. Thus, if two main memory locations have a access latency that differs by a factor of two, the data for the main memory location with the larger latency will be replaced only if it has been in cache memory 104 at least twice as long as the data for the location with the smaller latency.

In another example, a LRU strategy independent of the access latency may be used periodically or each time after a predetermined or randomly selected number of replacements.

What is claimed is:

1. A method of managing a cache memory in a processor that has a main memory that contains memory locations with a plurality of access latencies, the method comprising the steps of:

selecting of a cache replacement location in dependence on differences in respective access latencies of the main memory locations for which replaceable cache locations are in use;

using an address tag of data stored in the cache memory to determine the respective access latency of a respective main memory location; and placing a preference to replacement of a replaceable cache memory location according to whether the respective access latency of the respective main memory location cached in the replaceable cache memory location is smaller than another access latency of another main memory locations, cached in another replaceable cache memory location.

2. A method as claimed in claim 1, wherein for at least one cache miss said selecting step includes pre-selecting replaceable cache memory locations that cache main memory locations that have smaller access latency than main memory locations cached in non-pre-selected cache memory locations, said pre-selecting being executed dependent on an indication of access latency of the replaceable cache memory locations, a cache memory location being selected for replacement from the pre-selected cache memory locations.

3. A method as claimed in claim 2, further comprising the step of interleaving of selection of the cache replacement location independent of access latency with said selecting of the cache replacement location dependent on access latency.

4. A method as claimed in claim 1, further comprising the step of assigning preference values, each to a respective one of the replaceable cache memory locations dependent on the access latency of the main memory location cached in that respective one of the replaceable cache memory locations, and selecting the cache replacement location by means of a determination of which of the replaceable cache memory locations has a most preferred preference value.

5. A method as claimed in claim 4, wherein said preference value depends on a number of cycles that the replaceable cache memory location has not been accessed most recently, weighted more heavily as the access latency of the main memory location using the replaceable cache memory location has longer access latency.

6. A data processing apparatus, comprising:

a processor;

a main memory having an address space which addresses locations having at least two access latencies;

a cache memory between the main memory and the processor; and a cache management unit arranged to select a cache replacement location from replaceable cache memory locations in the cache memory, wherein the cache management unit selects the cache replacement location dependent on the relative access latencies of the main memory locations cached in the cache locations, the relative access latencies being determined from an address tag of data stored in the cache locations, a preference being given being given to replacement of a replaceable cache memory location according to whether an access latency of a main memory location cached in the replaceable cache memory location is relatively smaller than an access latency of other main memory locations, cached in other replaceable cache memory locations.

7. A data processing apparatus as claimed in claim 6, wherein the cache management unit is arranged to pre-select, for at least one cache miss, replaceable cache memory locations that cache main memory locations that have smaller access latency than main memory locations cached in non-pre-selected cache memory locations, the cache management unit executing said pre-selecting dependent on an indication of access latency of the replaceable cache memory locations, the cache management unit selecting a cache memory location for replacement from the pre-selected cache memory locations.

8. A data processing apparatus as claimed in claim 7, wherein the cache management unit is arranged to interleave selection of the cache replacement location independent of access latency with said selection of the cache replacement location dependent on access latency.

9. A data processing apparatus as claimed in claim 6, wherein the cache management unit is arranged to compute a preference value based on a number of cycles that the replaceable cache memory location has not been accessed most recently, weighted more heavily as the access latency of the main memory location using the replaceable cache memory location has longer access latency.

10. A data processing apparatus as claimed in claim 6, comprising a first and second integrated circuit, the first integrated circuit containing the processor, the cache memory and a first part of the main memory, the first part containing main memory locations with relatively faster access latencies, the second integrated circuit containing a second part of the main memory, with relatively slower access latencies.

11. Integrated circuit arranged for use as first integrated circuit in an apparatus according to claim 10.

* * * * *